Dec. 26, 1950  W. A. PLEDGER  2,535,863
VENTILATING DEVICE FOR A KITCHEN
AND A KITCHEN STOVE
Filed Sept. 3, 1946  5 Sheets-Sheet 1

INVENTOR.
WILLIAM A. PLEDGER
BY Alexander Riaboff
ATTORNEY

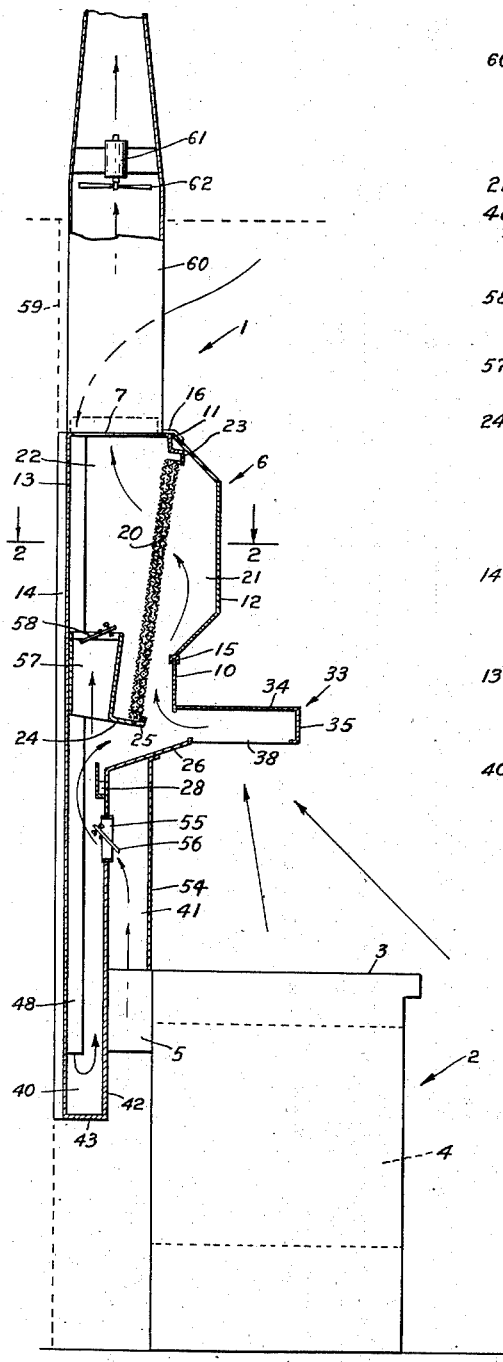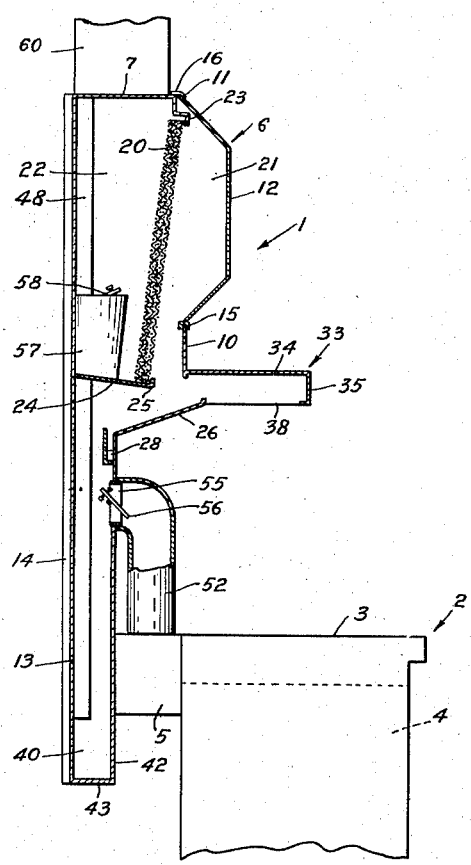

Dec. 26, 1950 W. A. PLEDGER 2,535,863
VENTILATING DEVICE FOR A KITCHEN
AND A KITCHEN STOVE
Filed Sept. 3, 1946 5 Sheets-Sheet 3

INVENTOR.
WILLIAM A. PLEDGER
BY Alexander Riaboff
ATTORNEY

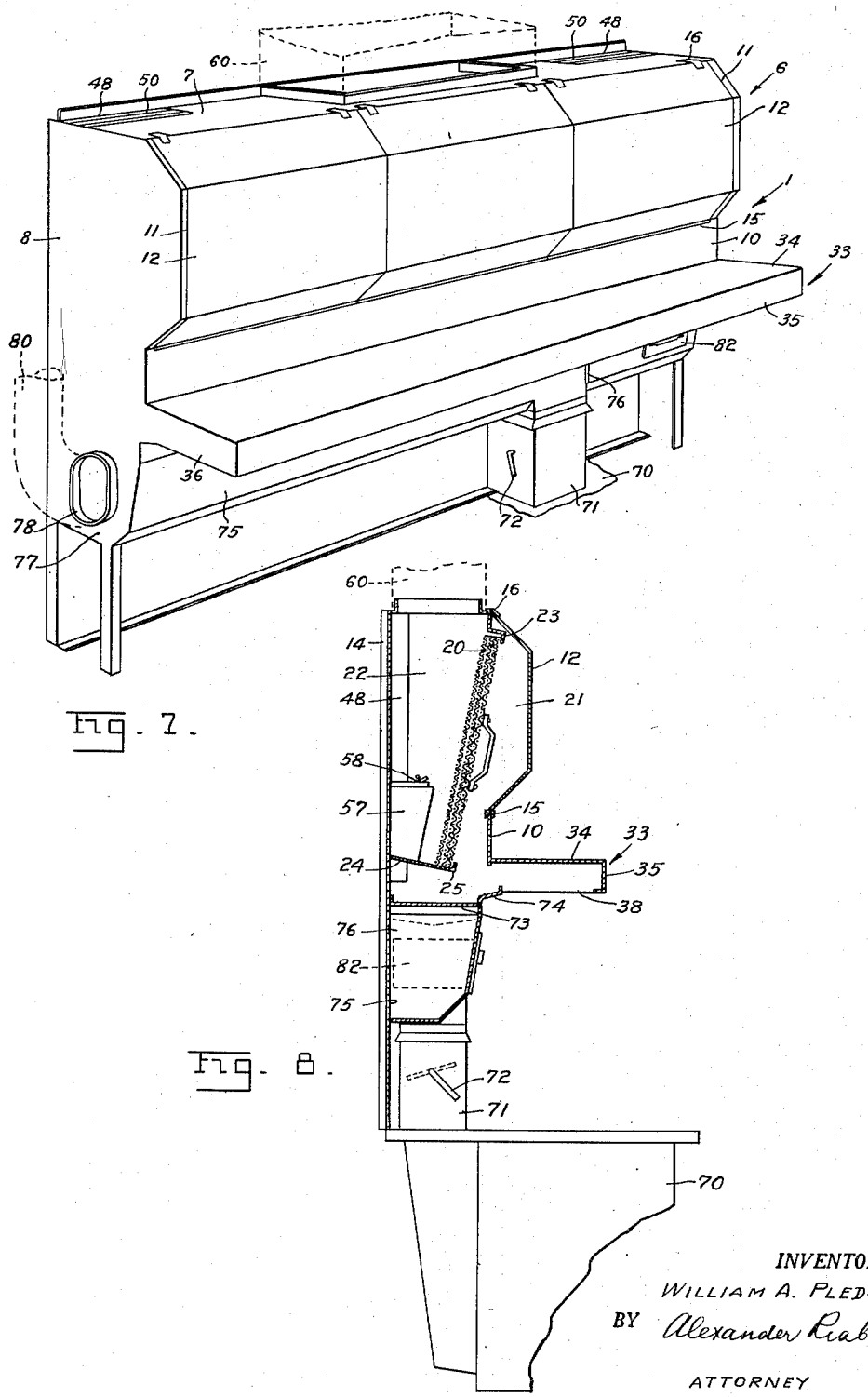

Patented Dec. 26, 1950

2,535,863

UNITED STATES PATENT OFFICE 2,535,863

VENTILATING DEVICE FOR A KITCHEN AND A KITCHEN STOVE

William A. Pledger, San Francisco, Calif.

Application September 3, 1946, Serial No. 694,566

5 Claims. (Cl. 126—301)

This invention relates to a ventilating device for a kitchen.

The object of this invention is to provide a device for eliminating of kitchen odors, products of combustion and hot air generated by a kitchen stove and for condensing grease and oil by means of filters out of the air drawn from said kitchen, so as to discharge into the atmosphere hot odorless air devoid of grease and oil.

Another object of this invention is to provide a device which is an improvement on the device described in my copending patent application Serial #620,035 filed October 3, 1945, now Patent 2,481,341, Sept. 6, 1949 on a ventilating device for a kitchen and a kitchen stove.

Another object of this invention is to provide an improved arrangement of various parts of the device whereby all grease and oil which settle on the filters, or inside walls of the device, are collected into a grease tank.

Another object of the invention is to provide a device of the type described having automatic dampers by which an open path for gases, hot air and fumes is maintained when the forced draft is unoperative.

Other objects and advantages will appear as the specification proceeds and the particular features of the invention will be specifically pointed out in the appended claims.

My invention is illustrated in the accompanying drawings in which

Fig. 3 is a central vertical cross-section through the device;

Fig. 4 is a central vertical cross-section through a modified form of the device showing a different flue;

Fig. 7 is a perspective view of still another modification of the device;

Fig. 8 is a central vertical cross-section of the device shown in Fig. 7; and

Figure 1:
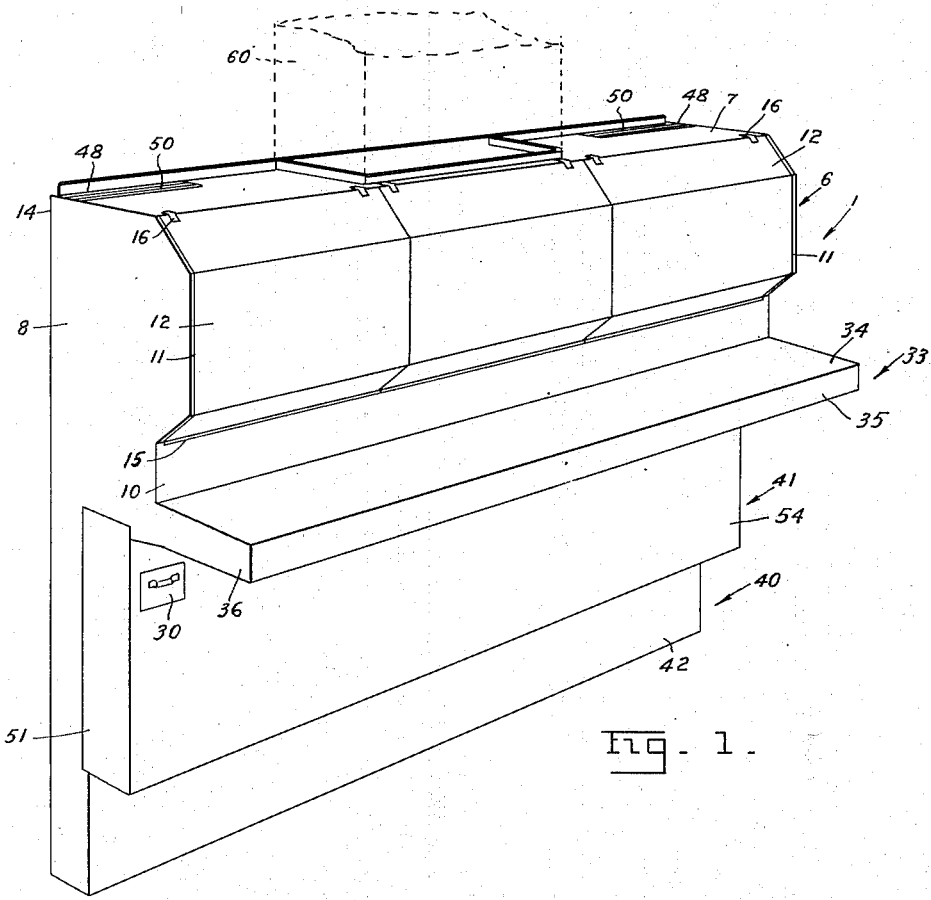
Fig. 1 is a perspective view of the ventilating device.
Figure 2:
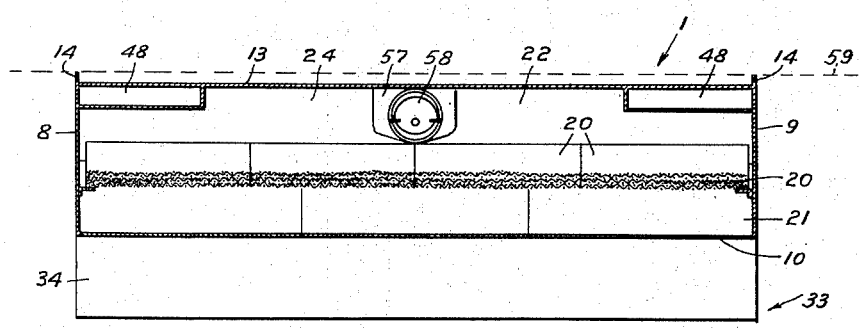
Fig. 2 is a horizontal cross-section through the device taken along the line 2—2 of Fig. 3.

Figs. 1 to 4 inclusive, show an adaptation of the ventilating device, generally indicated at 1, to a gas range 2. The latter includes a cooking surface 3, an oven 4, and a flue 5, extending back of the gas range 2 throughout the length thereof, which flue guides the products of combustion, fumes and odors from said oven.

The ventilating device is preferably made out of sheet metal and comprises a chamber 6 arranged above the gas range 2 and consisting of a top 7, sidewalls 8 and 9, a front wall 10 having an opening 11 in it which is closed by removable panels 12. The back of the device 1 is closed by a back wall 13, which extends considerably below the cooking surface 3. The back wall 13 has a flange 14 on each side thereof extending a certain distance at a right angle to said wall. The flanges 14 keep the back wall 13 of the device a certain distance away from the building wall near which the gas range 2 is set, thus minimizing fire hazard.

The panels 12 are secured in the opening 11 by a channel 15 attached to the lower rim of said panels which straddle the upper edge of the front wall 10, and by locks 16 attached to the top of said panels.

The chamber 6 is divided by a plurality of filters 20 into a front compartment 21 and a rear compartment 22. The filters 20 may be of any construction and are shown here as consisting of several layers of a wire screen. Their function is to clean the air passing therethrough by condensing oil, grease, evaporations, and fumes contained in said air.

The filters 20 are retained in the upper bracket 23 attached to the top 7, and in the trough 24 which is arranged in the lowermost portion of said chamber 6, thus the filters 20 extend from the top of the chamber to the lowermost portion thereof. The filters 20 may be easily removed from their place and taken out of the device through the opening 11 for the purpose of cleaning or inspection.

Oil, grease and evaporations, condensed by said filters 20 out of the air, gradually find their way into the trough 24. The latter has a number of perforations 25 in the bottom thereof through which said condensates drop onto an inclined collector plate 26, and therefrom they flow into an inclined drain 28, under the lower end of which is a small removable grease tank 30 in which the condensates are collected.

The collector plate 26 extends between the side walls 8 and 9 and is of such width that it reaches under the front wall 10 and the trough 24. A small portion of grease and oil may settle on the inner side of the panels 12 and the front wall 10, which grease and oil gradually find their way downwardly to the end of said wall and therefrom drop onto the collector plate 26. If the filters 20 are dirty, they may pass some grease and oil therethrough which settles on the walls of the rear compartment 22. The grease and oil settled on said walls will flow downwardly to the trough 24 and will be discharged therefrom through the perforations 25 onto the collector plate 26. Thus all the condensates, oil and grease which may settle anywhere in the chamber 6 are collected by the collector plate 26 and directed by the latter into the drain 28 from which the same are discharged into the tank 30.

An intake spout 33 is attached to the lower end of the front wall 10. The spout 33 consists of a horizontal top 34 extending from said front wall forwardly and some distance above the cooking surface 3 over substantially a half of the width and the whole length of the latter. The spout 33 also has a front wall 35 and the sides 36 and has its bottom opened as at 38.

Hot air, fumes, and products of combustion rising from the cooking surface 3 are drawn into the intake spout 33 and further into the front compartment 21.

Below the collector plate 26 there are arranged an insulating chamber 40 and a flue duct 41. The insulating chamber 40 is formed by the back wall 13 and a front wall 42, a bottom 43 and the sidewalls 8 and 9, and it contains two hot air passages 48 located at the side walls 8 and 9. The passages 48 begin at the top 7 and terminate some distance above the bottom 43. Said passages are provided for the purpose of ventilating the kitchen by drawing hot air from the space above said device. The amount of hot air to be drawn through said passages may be regulated by louvres 50 arranged at the top thereof. The hot air is drawn through said passages 48 downwardly and enters the insulating chamber 40 at the bottom whereupon it rises upwardly into the front compartment 21.

The flue duct 41 is provided for the purpose of directing fumes and products of combustion from the oven 4 to which it is connected into the front compartment 21. The duct 41 is formed by the front wall 42 of the insulating chamber 40, a duct front wall 54 and side walls 51.

Fig. 4 shows a modification of the device 1 wherein the flue duct 41 is substituted by a conventional open flue in form of a pipe 52.

An automatic safety damper 55 is provided in the wall 42, connecting the flue duct 41 or the pipe 52 with the insulating chamber 40. The safety damper 55 is of a standard type having an adjustably balanced closure disk 56 which is normally opened as shown in the Figs. 3 and 4.

The automatic safety damper 55 keeps an open path for fumes and products of combustion when the forced draft is inoperative, and partially closes said path when the forced draft is in operation depending upon the draft and the flow of fumes and products of combustion from the oven 4.

A bypass 57 with an automatic safety damper 58 arranged at the top thereof is provided in the chamber 6 between the filters 20 and the back wall 13. The bypass 57 is in form of a funnel extending from the bottom of the chamber 6 upwardly and operatively connecting the front compartment 21 with the rear compartment 22. The damper 58 is of identical construction with the damper 55 and is normally open so as to pass hot air, fumes and products of combustion therethrough, but said damper 58 completely closes when the forced draft is in operation so as to force said hot air, fumes and products of combustion to pass through the filters 20.

A stack 60 is arranged over the middle of the device which stack has arranged therein an electric motor 61 and a fan 62 driven thereby to draw air from the rear compartment 22 through said stack into the atmosphere.

The motor 61 and the fan 62 create a forced draft in the device 1 which draws all fumes, odors, products of combustion of the gas range and the hot air around the same through the intake spout 33 and the flue duct 41 or the pipe 52 into the front compartment 21, and also draws warm room air which accumulates above the device through the hot air passages and discharges said air into the insulating chamber 40 near the bottom thereof.

Said room air cools the insulating chamber 40, which serves as insulation between the range and the wall 59 near which the latter is installed. Upon leaving the chamber 40 said hot air enters the front compartment 21, wherein it is mixed with fumes and products of combustion thus thinning the latter and making them easier to filter. The filtered air is discharged into the atmosphere and the condensates are collected as above described.

The size of the passages 48 depends upon the size of the device 1 which may take care of one or several pieces of cooking equipment. It has been determined that in order to take care of the extreme heat, fumes and products of combustion, the size of the passages 48 should be such as to deliver 100 cubic feet of air per minute per each linear foot of cooking equipment, and the intake spout 33 and the flue duct 41, or the pipe 52, should deliver 300 cubic feet of air, fumes and products of combustion per minute per each linear foot of cooking equipment. Therefore, the filters 20 should be of such size as to pass 400 cubic feet of air, fumes and products of combustion per minute per each linear foot of cooking equipment.

The suction through the intake spout 33 not only takes care of the fumes and hot air emanating from the cooking surface, but draws air into the same from around the gas range, thus keeping an operator of the gas range in the stream of fresh air and outside of said fumes and evaporations, even when the oven door is open.

The panels 12 are made convex for the purpose of providing room in front of the filters 20 for fumes and products of combustion which did not pass through the lower part of said filters at the entrance into the front compartment 21.

The forced draft closes the automatic damper 58 thus forcing air through the filters 20 and also partially closes the damper 55 leaving an opening enough for the products of combustion and fumes from the oven to pass giving a perfect balanced operation with or without forced draft. Said dampers 55 and 58 stay open when the forced draft is inoperative thus keeping a free passage to the stack 60 for fumes and escaping gas when gas range cocks are erroneously open and burners not lighted, thus preventing accumulation of gases. The device properly adjusted, does not need any attention and is fully automatic and safe.

Figure 5:
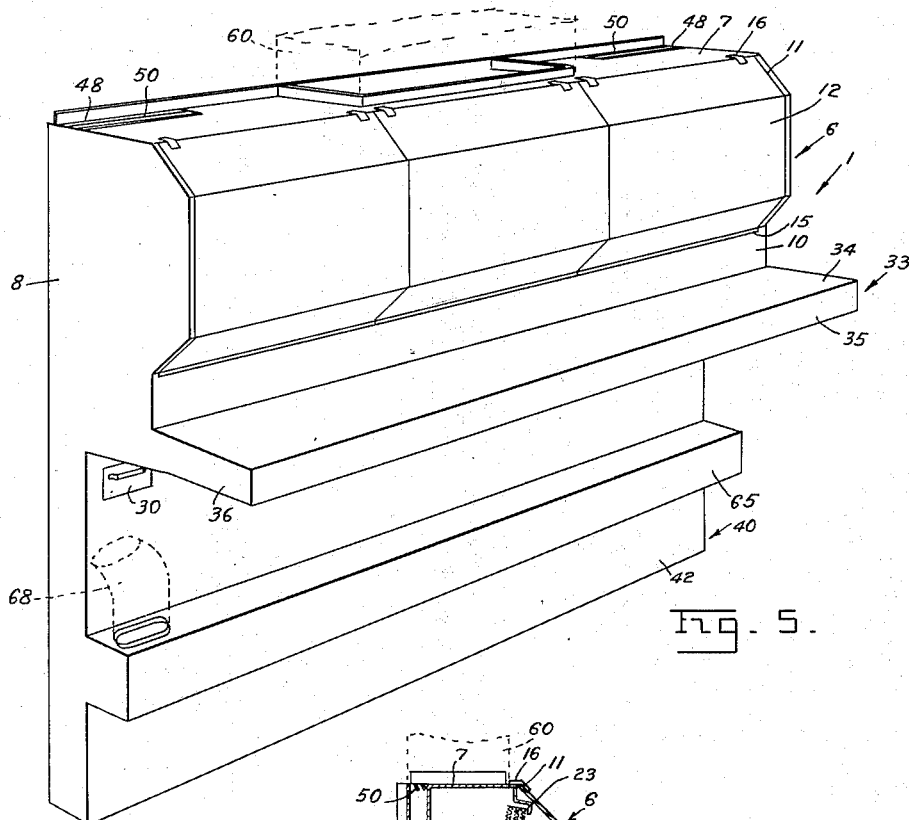
Fig. 5 is a perspective view of a modified form of the device.
Figure 6:
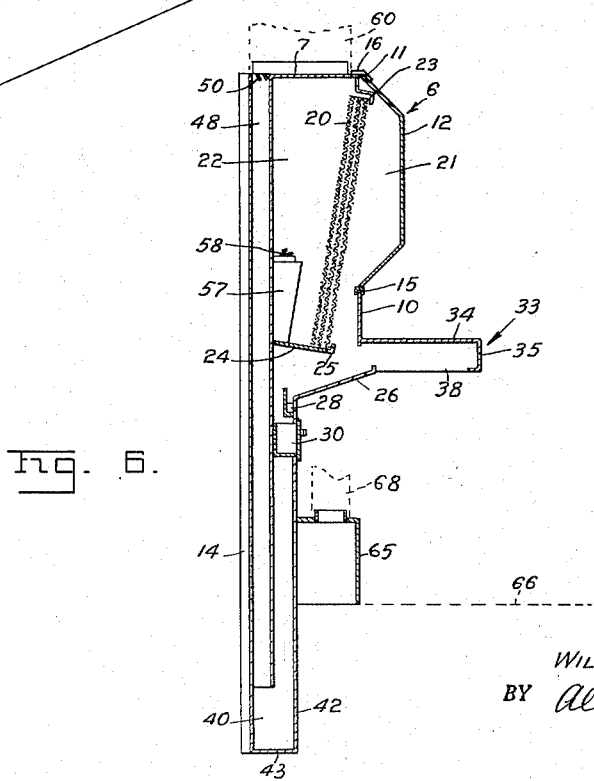
Fig. 6 is a vertical cross-section of the device shown in Fig. 5.

Figs. 5 and 6 show another modified form of my invention as an adaptation of said device to a coal, wood, or oil stove 66. The construction of the chamber 6 is the same as in above described forms and includes the filters 20, the front compartment 21 and the rear compartment 22. It also has the by-pass 57 with the automatic damper 58. But the flue duct 41 is substituted by a horizontally disposed collecting duct 65 which collects the products of combustion of the stove 66 or a number of such stoves, if two or more are set close to each other.

The collecting duct is connected by a pipe 68 to the stack, not shown in the drawings. The collecting duct is not operatively connected to the chamber 6, as the smoke from the burnt coal, wood or oil would soil and clog the filters 20 and the inside of said chamber and prevent proper concentration of oil and grease from air passing through said filters.

Figs. 7 and 8 show another adaptation of the device to a coal, wood or oil stove 70, where the latter has an extended flue collar 71 with a manual damper 72. In the latter case the chamber 6 has substantially the same construction as in the above described device 1. But the insulating chamber 40 is omitted and the chamber 6 is closed by an inclined bottom 73 which serves as a drain trough. The portion 74 of the bottom 73 forms an inclined surface to collect grease and oil dripping from the front wall 10 and direct the same onto the bottom 73. The hot air passages 48 terminate in close proximity to said bottom.

A smoke passage 75 provided under said bottom communicates with the flue collar 71. The smoke passage 75 has a partition 76 which permits smoke from the flue collar 71 to pass to the side wall 77 wherein an opening 78 is provided to pass smoke into a pipe 80 which is connected with a smoke stack not shown in the drawings. The passage 75 beyond said partition 76 contains a grease container 82 into which grease from the bottom 73 drips.

Figure 9:
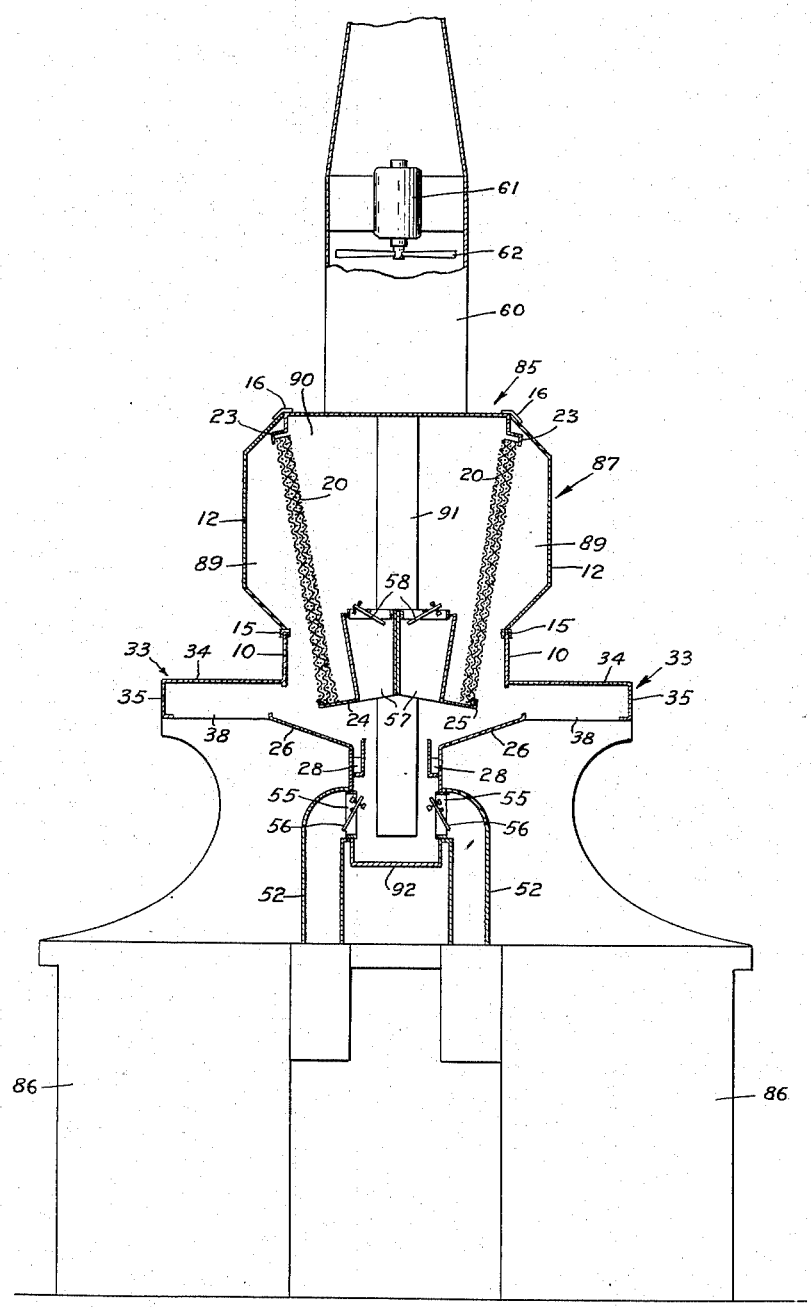
Fig. 9 is a vertical cross-section of a modified form of the device adapted to serve two stoves arranged back to back.

Fig. 9 shows a duplex ventilating device 85 as adapted for two rows of stoves 86 arranged back to back. The device 85 has a common chamber 87 having two rows of filters 20 arranged therein dividing said chamber into two front compartments 89 and a rear compartment 90. The filters 20 are held in place by the above described bracket 23 and by the trough 24 and the condensates are collected by the collector plates 26 and directed into the drains 28 wherefrom the same are discharged into the grease tank.

The device has the usual by-passes 57 and the automatic safety dampers 55, which dampers are operatively connected with the ovens by the pipes 52. The chamber 87 has a pair of passages 91 through which hot air is drawn from above the device 85. The passages 91 terminate some distance above the bottom 92 of the device. The operation of this device is exactly the same as of those shown in Figures 1 to 4 inclusive.

Having thus described my invention, I claim:

1. The combination of a cooking stove having an oven, with a ventilating device comprising means forming a chamber located above said stove; a filter arranged in said chamber and dividing the same into front and rear compartments; an intake spout extending above said stove and communicating with the said front compartment, said spout being adapted to draw air and fumes from the top of stove; means connecting the oven with the front compartment for directing fumes and products of combustion from said oven; said device having a passage for directing room air above said device downwardly and upwardly to the front compartment; said filter adapted to condense grease and oil from the air passing from the front compartment through the filter and into the rear compartment; a collector plate adapted to collect grease and oil condensed by the filter and settled on the inner walls of the front compartment; means for drawing air away from the rear compartment; and an automatic safety vent which permits air and fumes to by-pass said filter when the means for drawing air are inoperative.

2. The combination of two cooking stoves having ovens arranged back to back with a duplex ventilating device, comprising means forming a common chamber arranged above said stoves; a plurality of filters in said chamber dividing the same into two front compartments and a rear compartment, an intake spout extending from the lower part of the chamber toward and over the middle of said stoves, said spouts adapted to draw fumes and hot air from the tops of the cooking stoves; a flue connecting said chamber with the oven of each stove to draw fumes and products of combustion from said ovens; said device having a passage for directing room air above the device downwardly to the bottom of said device and therefrom upwardly into said front compartments, said filters being adapted to condense oil and grease from the air, fumes and products of combustion passing therethrough; means for collecting said grease and oil; and means for drawing air, fumes, and products of combustion through said filters.

3. The combination of a cooking stove having a cooking surface and an oven with a ventilating device comprising means forming a chamber, a filter in said chamber for condensing grease and oil from the air passing therethrough; a flue duct extending from said oven toward the chamber; said duct having an automatic damper therein; a blower for drawing fumes and air from the cooking surface and the oven; said automatic damper being adapted to stay open when the blower is inoperative and to be only partially open when the blower is operating; a stack; means forming a by-pass in the chamber, said by-pass communicating with the stack; means for keeping said by-pass closed when the blower is operating, and for keeping said by-pass open and permitting said fumes and hot air to pass into the stack when the blower is inoperative.

4. The combination of a cooking stove having a cooking surface and an oven with a ventilating device comprising means forming a chamber; a filter in said chamber; means forming a duct extending from said oven toward said chamber; a stack; means for drawing fumes and air from said cooking surface and said oven through said filter into said stack; and means forming a bypass for said fumes and air into said stack directly when the means for drawing fumes and air are inoperative.

5. A ventilating device comprising means forming a chamber having a top, front and back walls and two sides; a filter dividing said chamber into a front and a rear compartment and adapted to condense grease and oil from the air passing therethrough; means forming an air intake arranged at the bottom of said chamber and communicating with the front compartment; a stack communicating with the rear compartment for expelling air therefrom into the atmosphere; means for forming passages opened at the top and passing through the rear compartment, the lower end of which passages communicate with the front compartment; means for drawing air from the front compartment, through the filter into the rear compartment and into the stack;

and a by-pass arranged between the front and the rear compartment, which by-pass is adapted to be closed when means for drawing air is in operation and to be opened when the last mentioned means are inoperative.

WILLIAM A. PLEDGER.

REFERENCES CITED

The following references are of record in the file of this patent:

UNITED STATES PATENTS

| Number | Name | Date |
|---|---|---|
| 145,674 | Meyer | Dec. 16, 1873 |
| 607,976 | Amos | July 26, 1898 |
| 1,584,619 | Lloyd | May 11, 1926 |
| 1,671,524 | Gerdes | May 29, 1928 |
| 1,732,315 | Ray | Oct. 22, 1929 |
| 1,825,245 | Nitka | Sept. 29, 1931 |
| 2,081,640 | Petersen | May 25, 1937 |
| 2,369,375 | Sonntag | Feb. 13, 1945 |
| 2,392,038 | Gaylord | Jan. 1, 1946 |
| 2,398,508 | Shoemaker | Apr. 16, 1946 |

FOREIGN PATENTS

| Number | Country | Date |
|---|---|---|
| 147,382 | Great Britain | July 22, 1920 |
| 370,159 | Great Britain | Apr. 7, 1932 |
| 370,160 | Great Britain | Apr. 7, 1932 |